(12) United States Patent
Doi et al.

(10) Patent No.: US 6,675,830 B2
(45) Date of Patent: Jan. 13, 2004

(54) VALVE UNIT CAPABLE OF MONITORING OUTPUT PRESSURE

(75) Inventors: Yoshitada Doi, Tsukuba-gun (JP); Makoto Nomura, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/271,539

(22) Filed: Oct. 17, 2002

(65) Prior Publication Data
US 2003/0075220 A1 Apr. 24, 2003

(30) Foreign Application Priority Data
Oct. 18, 2001 (JP) ........................................ 2001-320830

(51) Int. Cl.$^7$ ............................................. F16K 37/00
(52) U.S. Cl. ................ 137/552; 137/554; 137/557; 137/625.64; 137/625.69; 137/884
(58) Field of Search ........................ 137/625.64, 557, 137/554, 552, 884, 625.69, 487.5; 251/367

(56) References Cited

U.S. PATENT DOCUMENTS 5,101,856 A * 4/1992 Kakinuma et al. .......... 137/554
5,819,783 A * 10/1998 Blatt et al.
6,186,161 B1 * 2/2001 Hiramatsu ................... 137/271
6,520,202 B2 * 2/2003 Miyazoe et al. ............ 137/554

* cited by examiner

Primary Examiner—A. Michael Chambers
(74) Attorney, Agent, or Firm—Oblon, Spivak, McClelland, Maier & Neustadt, P.C.

(57) ABSTRACT

A pressure control apparatus which controls a pressure of air supplied from a supply hole of a base having a plurality of holes to a supply port of a valve having a plurality of ports is interposed between the base and the valve. This pressure control apparatus comprises a pressure control section which controls a pressure of the air such that the pressure becomes equal to a set pressure, a booster section which outputs a large amount of air to the valve by controlling an output pressure by air from this pressure control section, and a signal control section which outputs a monitor signal indicative of completion of pressure setting when the pressure of air output from the booster section becomes equal to the set pressure.

6 Claims, 2 Drawing Sheets

VALVE UNIT CAPABLE OF MONITORING OUTPUT PRESSURE

TECHNICAL FIELD

The present invention relates to a valve unit which is suitable when miniaturization and weight reduction thereof are required to be mounted to a robot arm and it is required to have a monitor function of an output pressure, like a valve having a fluid pressure control mechanism for driving a gun cylinder for spot welding.

RELATED ART

It is general to control a clamp pressure in a gun cylinder for spot welding by a pressure control apparatus, and to output the pressure through a valve. In such a case, general-purpose parts are used as the pressure control apparatus, the valve and a pressure sensor, and they are individually disposed and connected to each other by piping. Therefore, piping installation is required therebetween, and when the entire structure is complicated due to the piping, weight thereof is increased, and in order to mount the valve to a robot arm or the like, miniaturization, weight reduction, simplification of the structure, simplification of the piping installation of the structure and the like are desired. This is required when the pressure control apparatus, the valve and the like are to be mounted to the robot arm but in generally, miniaturization is always required for plant and equipment.

Further, when elements such as the pressure control apparatus, the valve and the pressure sensor are individually installed as described above, when completion or the like of pressure setting by the pressure control apparatus is to be monitored, the wiring and piping therefor become complicated, and devices for monitoring are confusedly disposed. Further, when the elements such as the pressure control apparatus, the valve and the pressure sensor are connected to each other by piping, pressure loss in the connection piping becomes great, a capacity of a pressure air sealing portion in the piping is increased. Thus, there is a problem that the pressure setting precision is lowered, and responsivity is also lowered.

DISCLOSURE OF THE INVENTION

It is a technical object of the present invention to provide a valve unit having a fluid pressure control mechanism which is mounted to a robot arm and used, in which means for monitoring a state in which the setting of an output pressure or a pressure is completed can be incorporated easily and compactly.

It is another technical object of the invention to provide a valve unit in which a need of piping between the pressure control apparatus, the valve and the pressure sensor is eliminated and as a result, miniaturization, weight reduction, simplification of the structure, simplification of the piping installation of the structure and the like are simplified so that the monitor means for the output pressure and the like can be incorporated compactly.

It is another technical object of the invention to provide a valve unit capable of monitoring an output pressure in which increase in pressure loss caused by the piping and increase in capacity of a pressure air sealing portion are suppressed, pressure setting precision and responsivity are enhanced.

It is another technical object of the invention to provide a valve unit capable of monitoring the output pressure in which a general-purpose base-mount type valve which is mounted on a base is utilized as it is, and a pressure control apparatus can be sandwiched between the base and the valve.

To achieve the above object, according to the present invention, there is provided a valve unit capable of monitoring an output pressure, comprising a base having a plurality of holes including a supply hole, a valve having a plurality of ports including a supply port, and a pressure control apparatus interposed between these base and valve for controlling a pressure of air supplied from the supply hole to the supply port, the base, the valve and the pressure control apparatus being integrally combined with each other.

The pressure control apparatus in this valve unit comprises a pressure control section which controls and outputs a pressure of air supplied from the supply hole of the base such that the pressure becomes equal to a set pressure applied from outside by an electric signal; a booster section for outputting a large amount of air to the supply port of the valve when an output pressure is controlled by air from the pressure control section; a first pressure sensor for detecting a pressure of the air output from the pressure control section to the booster section; a second pressure sensor for detecting a pressure of air output from the booster section to the valve; and a signal control section having a function to compare the pressure detected by the first pressure sensor and the set pressure, and when these pressures become equal to each other, to maintain the pressure control section in that control state, and having a function to compare the pressure detected by the second pressure sensor and the set pressure, and when these pressures become equal to each other, to output a monitor signal indicative of completion of pressure setting.

The pressure control apparatus may include a lamp which is lit when the pressure setting is completed.

According to concrete structure of the present invention, the pressure control section of the pressure control apparatus includes a diaphragm driving valve for controlling the booster section in accordance with the electric signal for setting a pressure, and a supply valve and an exhaust valve both for driving the diaphragm driving valve, the diaphragm driving valve includes first and second diaphragm chambers formed on opposite sides of a diaphragm, an air supply valve member which is opened when a pressure in the first diaphragm chamber is higher than a pressure in the second diaphragm chamber, and an exhaust valve member which is opened when the former pressure is lower than the latter pressure, the first diaphragm chamber is in communication with the supply hole of the vase through the supply valve, the exhaust valve is in communication with outside through the exhaust valve, the second diaphragm chamber is in direct communication with the booster section and is in communication with the supply hole of the base through the air supply valve member and is also in communication with outside through the exhaust valve member, the signal control section has a function to open and close the supply valve and the exhaust valve in accordance with a difference between the set pressure and a pressure detected by the first pressure sensor.

According to another concrete structure of the present invention, the booster section of the pressure control apparatus includes a slidable piston, a first piston chamber and a second piston chamber formed on opposite sides of the piston, a rod extending from the piston, and a valve chamber opposed to a tip end of the rod, a control pressure output passage which is in communication with the supply port of the valve, a supply passage which is in communication with the supply hole of the base and an exhaust passage which is opened into outside are in communication with the valve chamber, a supply valve seat is formed between the output passage and the supply passage, an exhaust valve seat is formed between the output passage and the exhaust passage, a supply valve member and an exhaust valve member which are driven by the rod to open and close a valve seat thereof are provided, the first piston chamber is in communication with the pressure control section, and the second piston chamber is in communication with the valve chamber.

According to further another concrete structure of the invention, the pressure control apparatus includes a flow path forming portion, the flow path forming portion includes the supply hole of the base, the supply passage connecting a pressure control section and a booster section, and the control pressure output passage connected the booster section and the valve, and includes a plurality of vent holes which bring other holes on the base except the supply hole and other ports of the valve except the supply port in communication with each other.

According to the present invention having such structures, in the valve unit having the fluid pressure control mechanism, means for monitoring a state in which the setting of an output pressure or a pressure is completed can easily and compactly be incorporated in the valve unit having a fluid pressure control mechanism, a need of piping between the pressure control apparatus and the valve or the pressure sensor is eliminated by sandwiching the pressure control apparatus between the base and the valve, it is possible to achieve miniaturization, weight reduction, simplification of the entire structure, and simplification of the piping installation. Further, increase in pressure loss which may be caused by piping installation or increase in capacity of compressed air sealing portion are suppressed by omitting the piping and with this, it is possible to enhance the pressure setting precision and responsivity.

DETAILED EXPLANATION

Figure 1:
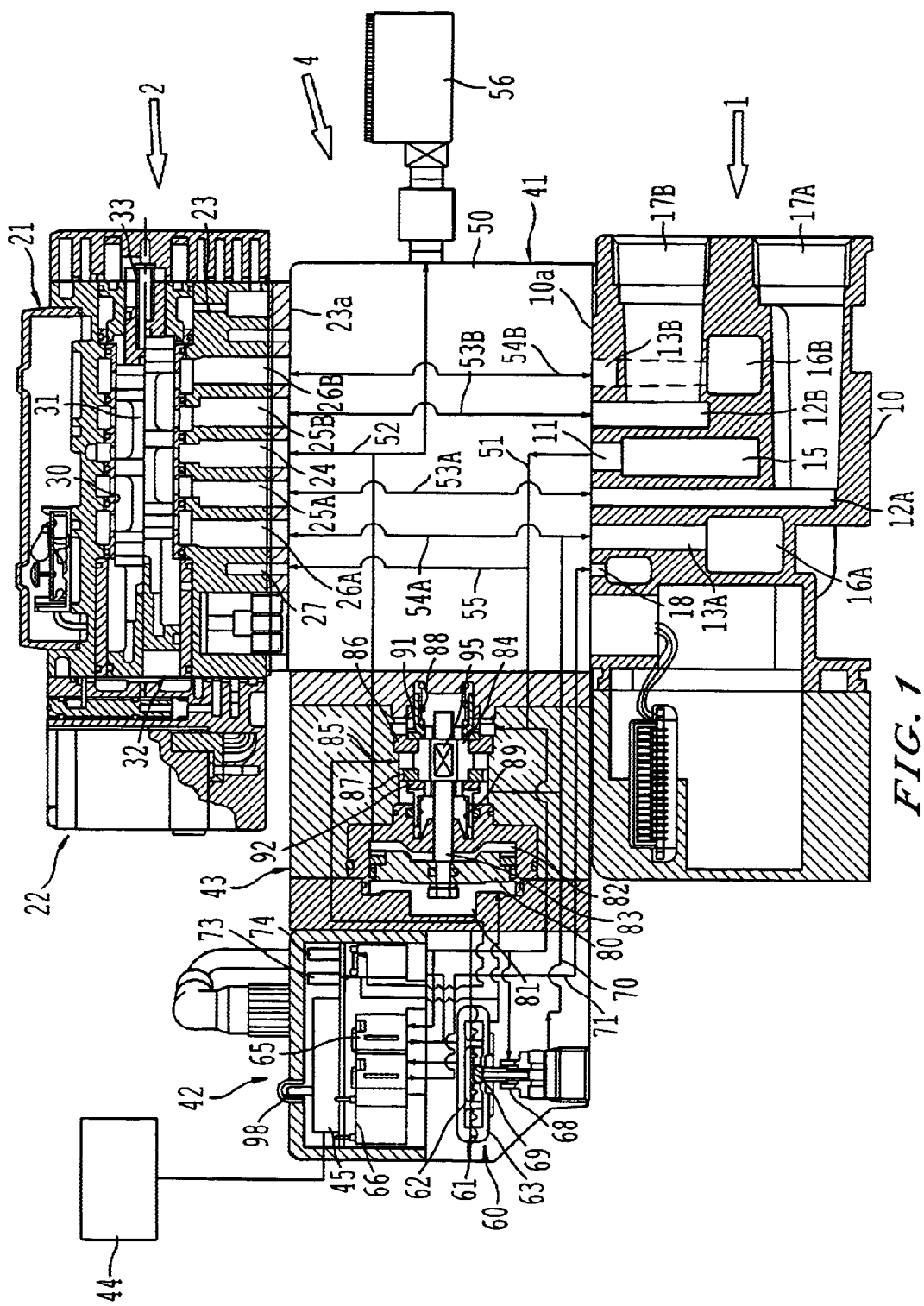
FIG. 1 is a vertical sectional view of an essential portion showing a structure of an embodiment of a valve unit capable of monitoring an output pressure according to the present invention, in which upper and lower halves of a valve body of a valve show different operation states.
Figure 2:
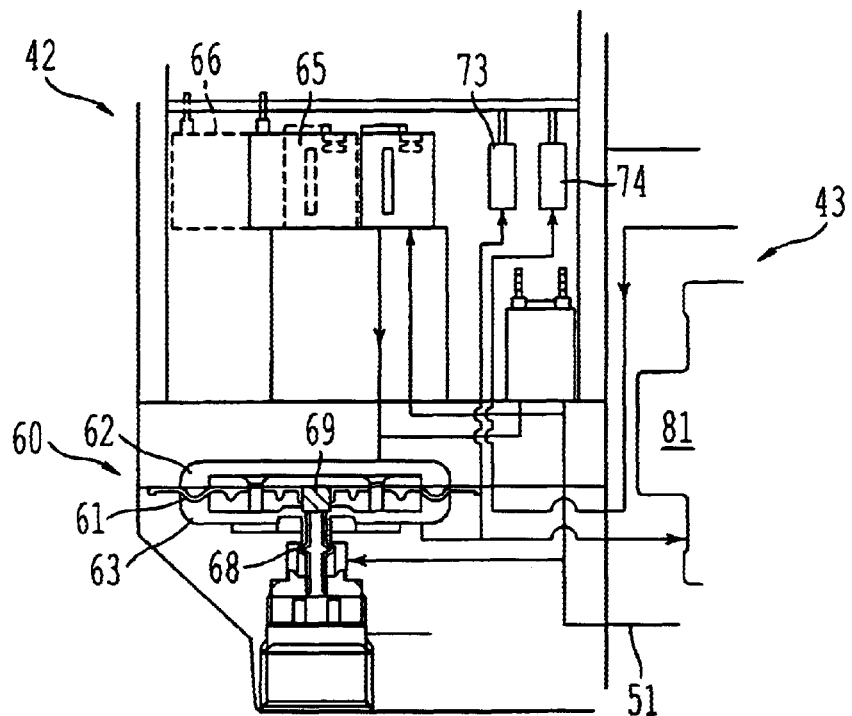
FIG. 2 shows a structure for explaining a structure of a pressure control section and operation of a supply valve in the embodiment.
Figure 3:
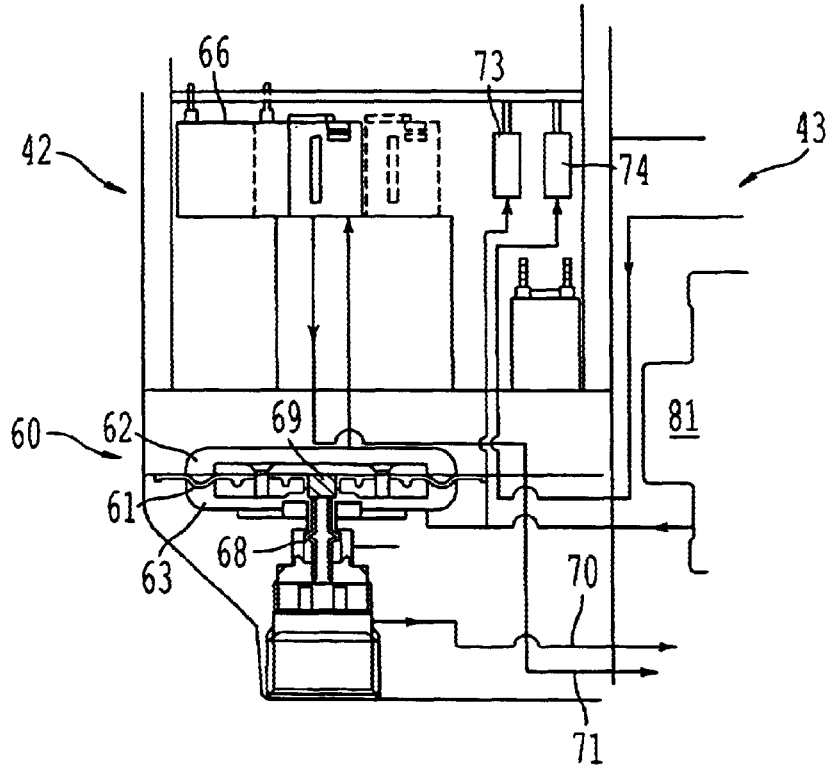
FIG. 3 shows a structure for explaining the structure of a pressure control section and operation of an exhaust valve in the embodiment.

FIGS. 1 to 3 show an embodiment of a valve unit of the present invention. The valve unit utilizes a general-purpose base-mount type valve constituted such that its valve 2 is mounted on a base 1, and a pressure control apparatus 4 can be sandwiched between the base 1 and the valve 2. Naturally, the base 1 and the valve 2 can directly bonded to each other and can be used as the base-mount type valve, and it is unnecessary to design or produce special base and valve for producing this valve unit.

A block body 10 of the base 1 is provided with a supply hole 11, a pair of output holes 12A and 12B, and a pair of discharge holes 13A and 13B. These holes are opened at a mounting surface 10a. The supply hole 11 and the pair of discharge holes 13A and 13B are in communication with a common supply passage 15 and common discharge passages 16A and 16B which connect adjacent bases with each other. The pair of output holes 12A and 12B pass through the block body 10 and opens at output pipe ports 17A and 17B on an end surface of the block body 10. An auxiliary discharge hole 18 opens at the mounting surface 10a of the block body 10, and the auxiliary discharge hole 18 is in communication with an exhaust passage 71 from an exhaust valve 66 in the pressure control apparatus 4.

The valve 2 supplies air whose pressure is controlled to a machine which is to be driven such as a gun cylinder for spot welding. The valve 2 can be mounted in the mounting surface 10a on the block body 10. A base-mount type valve is constituted by mounting the valve 2. The valve 2 includes a main valve portion 21 and a pilot valve 22. A supply port 24, output ports 25A and 25B and discharge ports 26A and 26B are opened at a mounting surface 23a provided on a valve body 23 of the main valve portion 21. These ports correspond to holes 11, 12A, 12B, 13A and 13B opened at a mounting surface 10a of the block body 10. An external pilot supply port 27 opens at the mounting surface 23a.

A pilot pressure chamber 32 is formed in a valve hole 30 of the valve body 23 on one end of the valve member 31 closer to the pilot valve 22. The pilot pressure chamber 32 slidably passes through the valve member 31, and drives a valve member 31 by pilot fluid from the pilot valve 22. A biasing force of a returning spring 33 is applied to the other end of the valve member 31. The supply port 24 is brought into one of the pair of output ports 25A and 25B by the valve member 31, and the other output port is brought into communication with one of the discharge ports 26A and 26B by the valve member 31.

That is, the main valve portion 21 moves the valve member 31 to one of switching positions by compressed air supplied to the pilot pressure chamber 32 by action of the pilot valve 22, and outputs the compressed air from the supply port 24 to the other output port 25A. Further, the main valve portion 21 releases the actuation of the pilot valve 22 to return the valve member 31 to the other switching position by a biasing force of the returning spring 33, and outputs compressed air from the other output portion 25B.

The pressure control apparatus 4 interposed between the base 1 and the valve 2 comprises a flow path forming portion 41 having a plurality of flow paths connecting the holes of the base 1 and the ports of the valve 2 to each other, a pressure control section (regulator) 42 for controlling an air pressure from the supply hole 11 of the base 1 to a set pressure based on an electric signal (serial signal) sent to a signal control section 45 from an external control unit 44, and a booster section 43 for increasing the compressed air and outputting the same to the valve 2.

The flow path forming portion 41 includes a body 50 interposed between the mounting surface 10a in the block body 10 of the base 1 and the mounting surface 23a in the valve body 23 of the valve 2. The body 50 includes a supply passage 51 which is in communication with the supply hole 11 of the block body 10, and a control pressure supply passage 52 which controls a pressure of an air supplied to the supply passage 51 in accordance with a signal from the control unit 44 in the pressure control section 42, and which outputs the air to the supply port 24 of the valve 2. If necessary, the control pressure supply passage 52 can be provided with a pressure gage 56 for displaying an output pressure from the booster section 43. The flow path forming portion 41 includes vent holes 53A, 53B, 54A and 54B which bring the output holes 12A and 12B and the discharge holes 13A and 13B provided to the block 10 of the base 1 into direct communication with the output ports 25A and 25B corresponding to the valve 2 and the discharge ports 26A and 26B.

A pilot supply passage 55 which is bifurcated from the supply passage 51 is provided in correspondence with the external pilot supply port 27 of the valve 2. A pilot compressed air supplied to the pilot valve 22 through the external pilot supply port 27 is supplied to the pilot pressure chamber 32 by actuation of the pilot valve 22, thereby driving the valve member 31. Therefore, an external pilot flow path (corresponding to the auxiliary discharge hole 18) of the base 1 which is usually provided is not used. With this, the valve 2 is operated even when a set pressure of the pressure control apparatus 4 is equal to or lower than a using pressure of the pilot valve 22 in the valve 2.

The pressure control section 42 of the pressure control apparatus 4 includes a diaphragm driving valve 60. The diaphragm driving valve 60 includes first and second diaphragm chambers 62 and 63 defined by the diaphragm 61. The diaphragm 61 includes an air supply valve member 68 which opens when a pressure in the first diaphragm chamber 62 is higher than a pressure in the second diaphragm chamber 63, and an exhaust valve member 69 which opens when the latter pressure becomes higher than the former pressure. The pressure control section 42 includes a supply valve 65 (see FIGS. 1 and 2) and an exhaust valve 66 (see FIGS. 1 and 3). The supply valve 65 brings the supply passage 51 which is in communication with the supply hole 11 of the base 1 into communication with the first diaphragm chamber 62. The exhaust valve 66 discharges out fluid in the first diaphragm chamber 62 through the exhaust passage 71.

Further, the second diaphragm chamber 63 is in direct communication with a booster section 43 which increases a pressure of the second diaphragm chamber 63, and is also in communication with the supply passage 51 through the air supply valve member 68, and is also in communication with a control section exhaust passage 70 through the exhaust valve member 69, and is opened into outside through the discharge hole 13A.

Therefore, when compressed air in the supply passage 51 is supplied to the first diaphragm chamber 62 by operation of the supply valve 65, the diaphragm 61 is pushed down in the drawing, which opens the air supply valve member 68. Therefore, the compressed air of the supply passage 51 is also supplied to the second diaphragm chamber 63 through the air supply valve member 68.

In this state, the exhaust valve member 69 provided in the diaphragm 61 closes the control section exhaust passage 70 extending from the second diaphragm chamber 63 to the discharge hole 13A of the base 1.

On the other hand, when compressed air of the first diaphragm chamber 62 is discharged to the exhaust passage 71 by the operation of the exhaust valve 66, the diaphragm 61 is pushed up by a pressure in the second diaphragm chamber 63 in the drawing, the air supply valve member 68 is closed and the exhaust valve member 69 is opened at the same time, and the compressed air in the second diaphragm chamber 63 is discharged to the discharge hole 13A of the base 1 through the control section exhaust passage 70.

The signal control section 45 of the pressure control apparatus 4 receives an electric signal (serial signal) concerning a set pressure sent from the control unit 44, and controls an air pressure output from the pressure control section 42 to the booster section 43 such that it becomes equal to this set pressure. That is, when the set pressure input by the electric signal is higher than an output air pressure sent to the booster section 43 detected by a first pressure sensor 73, the signal control section 45 opens the supply valve 65 to increase the air pressure, and when this air pressure reaches the set pressure, the signal control section 45 closes the supply valve 65. When the set pressure is lower than the output air pressure, the signal control section 45 opens the exhaust valve 66 to lower the air pressure, and when the air pressure reaches the set pressure, the signal control section 45 closes the exhaust valve 66.

Therefore, when an electric signal concerning a set pressure is input to the signal control section 45 of the pressure control apparatus 4 and the set pressure is higher than the output air pressure at that time, the supply valve 65 is opened by control of the signal control section, and compressed air of the supply passage 51 is supplied to the first diaphragm chamber 62. With this, compressed air from the supply passage 51 is supplied to the second diaphragm chamber 63 through the air supply valve member 68 as described above, since the second diaphragm chamber 63 is in communication with the first piston chamber 81 in the booster section 43, the compressed air supplied to the second diaphragm chamber 63 is also supplied to the first piston chamber 81.

A pressure detected by the first pressure sensor 73 is fed back to the signal control section 45, where the pressure is compared with the set pressure input from the control unit 44, and when the pressure detected by the pressure sensor 73 reaches the set pressure, the supply valve 65 is closed by the signal control section 45. Therefore, the set pressure is maintained in the first diaphragm chamber 62, an interior of the pressure control section 42 is maintained in a controlled state of that time, and a compressed air of the set pressure which is output of the pressure control section 42 is introduced to the first piston chamber 81.

On the other hand, the exhaust valve 66 is driven when the set pressure by the electric signal input to the signal control section 45 of the pressure control apparatus 4 is lower than the output air pressure at that time, and the compressed air of the first diaphragm chamber 62 is discharged out from the exhaust passage 71. With this, the exhaust valve member 69 is opened and the compressed air of the second diaphragm chamber 63 is discharged out through the control section exhaust passage 70 as described above, but since the second diaphragm chamber 63 is in communication with the first piston chamber 81, the compressed air of the first piston chamber 81 is also discharged out through the second diaphragm chamber 63.

A pressure detected in the pressure sensor 73 is fed back to the signal control section 45, and when the detected pressure is lowered to the set pressure, the exhaust valve 66 is closed by the signal control section 45. Therefore, a pressure in the first diaphragm chamber 62 is controlled such that the pressure always becomes equal to the set pressure input to the signal control section 45. A pressure in the first piston chamber 81 is maintained at the set pressure.

The booster section 43 includes the first piston chamber 81 defined by a piston 80 and a second piston chamber 82 formed on the opposite side from the first piston chamber 81. The second piston chamber 82 is in communication with a control pressure output passage 85 to which output of the booster section 43 is sent. The control pressure output passage 85 is in communication with the control pressure supply passage 52. In the valve chamber 84, a supply valve seat 86 and an exhaust valve seat 87 are disposed such that they are directed to opposite directions while sandwiching a connecting port of the control pressure output passage 85, a supply valve member 91 and an exhaust valve member 92 are respectively brought into contact under pressure with the supply valve seat 86 and the exhaust valve seat 87 by means of springs 88 and 89. The supply passage 51 which is in communication with the supply hole 11 of the base 1 is opened behind the supply valve member 91. The control section exhaust passage 70 is opened behind the exhaust valve member 92. A rod 83 connected to the piston 80 includes a pushing portion 95. The pushing portion 95 moves as the piston 80 moves in its axial direction, thereby opening the supply valve member 91 or the exhaust valve member 92. The control pressure output passage 85 is in communication with a second pressure sensor 74 which detects a pressure of output fluid output toward the valve 2. This second pressure sensor 74 may be provided on a device to be driven (cylinder) to detect a driving pressure, and the driving pressure may be fed back to the signal control section 45.

Therefore, compressed air which is controlled to the set pressure by the pressure control section 42 of the pressure control apparatus 4 is introduced into the first piston chamber 81 of the booster section 43, and when a pressure of the compressed air is higher than an air pressure of the second piston chamber 82, the supply valve member 91 is pushed and opened by the pushing portion 95 of the rod 83 connected to the piston 80. With this, the compressed air flows into the valve chamber 84 from the supply passage 51, and the compressed air is output toward the valve 2 through the control pressure output passage 85. This fluid pressure is fed back also to the second piston chamber 82, and when pressures in the piston chambers formed on the opposite sides of the piston 80 become equal to each other, the piston 80 is pushed back to the neutral position. Thus, the supply valve member 91 is closed, and compressed air whose pressure is the same as the set pressure which is introduced into the first piston chamber 81 is supplied to the supply port 24 of the valve 2 through the control pressure supply passage 52, and the compressed air is output to the device to be driven such as a cylinder in accordance with driving of the valve 2. When an air pressure of the control pressure output passage 85, i.e., a pressure in the second piston chamber 82 is lowered by output from the valve, the supply valve member 91 is naturally pushed and opened, and the air pressure of the control pressure output passage 85 is maintained at the set pressure.

When the air pressure which is controlled to the set pressure by the pressure control section 42 and introduced into the first piston chamber 81 is lower than an air pressure in the second piston chamber 82, the exhaust valve member 92 is pushed and opened by the pushing portion 95 of the rod 83 connected to the piston 80. A fluid pressure output toward the valve 2 from the control pressure output passage 85 is lowered, and this is fed back also to the second piston chamber 82. When pressures in the piston chambers on the opposite sides of the piston 80 become equal to each other, the piston 80 is pushed back to the neutral position, and the exhaust valve member 92 is closed. Therefore, compressed air having the same pressure as the set pressure introduced into the first piston chamber 81 is output to the supply port 24 of the valve 2 through the control pressure supply passage 52.

As described above, the output pressure in the booster section 43 is controlled by the compressed air whose pressure is controlled in the pressure control section 42, and the increased compressed air is output toward the valve 2. The air pressure output from the booster section 43 is detected by the second pressure sensor 74, the air pressure is fed back to the signal control section 45, and when the air pressure is equal to the set pressure applied to the signal control section 45 by the electric signal from the control unit 44, a signal indicative of completion of pressure setting is fed back to a monitor section of the control unit 44 and a lamp 98 provided on the pressure control section 42 is lit at the same time, and the completion of the pressure setting is indicated.

Not only the signal indicative of completion of the pressure setting, but also output pressure and other data can be fed back to the monitor section for monitoring from the signal control section 45.

In the pressure control apparatus 4, consideration is given such that a normally opened valve is used so that when electricity is cut off by some reason or when abnormal condition is generated in the electric signal concerning the set pressure, a pressure which is the same as a primary side pressure of the supply hole of the base 1 is automatically output.

As described above in detail, according to the valve unit of the present invention, means for monitoring the operation state of the pressure control apparatus can easily and compactly be incorporated in the valve unit having a fluid pressure control mechanism, a need of piping between the pressure control apparatus and the valve or the pressure sensor is eliminated by sandwiching the pressure control apparatus between the base and the valve, it is possible to achieve miniaturization, weight reduction, simplification of the entire structure, and simplification of the piping installation. Further, increase in pressure loss which may be caused by piping installation or increase in capacity of compressed air sealing portion are suppressed by omitting the piping and with this, it is possible to enhance the pressure setting precision and responsivity.

What is claimed is:

1. A valve unit capable of monitoring an output pressure, comprising a base having a plurality of holes including a supply hole, a valve having a plurality of ports including a supply port, and a pressure control apparatus interposed between these base and valve for controlling a pressure of air supplied from the supply hole to the supply port, said base, said valve and said pressure control apparatus being integrally combined with each other, wherein said pressure control apparatus comprises a pressure control section which controls and outputs a pressure of air supplied from said supply hole of said base such that the pressure becomes equal to a set pressure applied from outside by an electric signal; a booster section for outputting a large amount of air to said supply port of said valve when an output pressure is controlled by air from said pressure control section; a first pressure sensor for detecting a pressure of the air output from said pressure control section to said booster section; a second pressure sensor for detecting a pressure of air output from said booster section to said valve; and a signal control section having a function to compare the pressure detected by said first pressure sensor and said set pressure, and when these pressures become equal to each other, to maintain said pressure control section in that control state, and having a function to compare the pressure detected by said second pressure sensor and said set pressure, and when these pressures become equal to each other, to output a monitor signal indicative of completion of pressure setting.

2. A valve unit according to claim 1, wherein said pressure control apparatus includes a lamp which is lit when the pressure setting is completed.

3. A valve unit according to claim 1, wherein said pressure control section of said pressure control apparatus includes a diaphragm driving valve for controlling said booster section in accordance with the electric signal for setting a pressure, and a supply valve and an exhaust valve both for driving said diaphragm driving valve, said diaphragm driving valve includes first and second diaphragm chambers formed on opposite sides of a diaphragm, an air supply valve member which is opened when a pressure in said first diaphragm chamber is higher than a pressure in said second diaphragm chamber, and an exhaust valve member which is opened when the former pressure is lower than the latter pressure, said first diaphragm chamber is in communication with the supply hole of said vase through said supply valve, said exhaust valve is in communication with outside through said exhaust valve, said second diaphragm chamber is in direct communication with said booster section and is in communication with the supply hole of said base through said air supply valve member and is also in communication with outside through said exhaust valve member, said signal control section has a function to open and close said supply valve and said exhaust valve in accordance with a difference between said set pressure and a pressure detected by said first pressure sensor.

4. A valve unit according to claim 3, said booster section of said pressure control apparatus includes a slidable piston, a first piston chamber and a second piston chamber formed on opposite sides of said piston, a rod extending from said piston, and a valve chamber opposed to a tip end of said rod, a control pressure output passage which is in communication with said supply port of said valve, a supply passage which is in communication with said supply hole of said base and an exhaust passage which is opened into outside are in communication with said valve chamber, a supply valve seat is formed between said output passage and said supply passage, an exhaust valve seat is formed between said output passage and said exhaust passage, a supply valve member and an exhaust valve member which are driven by said rod to open and close a valve seat thereof are provided, said first piston chamber is in communication with said pressure control section, and said second piston chamber is in communication with said valve chamber.

5. A valve unit according to claim 1, wherein said booster section of said pressure control apparatus includes a slidable piston, a first piston chamber and a second piston chamber formed on opposite sides of said piston, a rod extending from said piston, and a valve chamber opposed to a tip end of said rod, a control pressure output passage which is in communication with said supply port of said valve, a supply passage which is in communication with said supply hole of said base and an exhaust passage which is opened into outside are in communication with said valve chamber, a supply valve seat is formed between said output passage and said supply passage, an exhaust valve seat is formed between said output passage and said exhaust passage, a supply valve member and an exhaust valve member which are driven by said rod to open and close a valve seat thereof are provided, said first piston chamber is in communication with said pressure control section, and said second piston chamber is in communication with said valve chamber.

6. A valve unit according to claim 1, wherein said pressure control apparatus includes a flow path forming portion, said flow path forming portion includes said supply hole of said base, said supply passage connecting a pressure control section and a booster section, and said control pressure output passage connected said booster section and said valve, and includes a plurality of vent holes which bring other holes on said base except said supply hole and other ports of said valve except said supply port in communication with each other.

* * * * *